United States Patent
Andreoli et al.

(10) Patent No.: US 10,530,635 B2
(45) Date of Patent: Jan. 7, 2020

(54) PLUGGABLE CONTROL SYSTEM FOR FALLBACK WEBSITE ACCESS

(71) Applicant: ACCENTURE GLOBAL SOLUTIONS LIMITED, Dublin (IE)

(72) Inventors: Giorgio Andreoli, Rome (IT); Giacomo Troiano, Rome (IT); Emanuele Baldassarre, Bari (IT)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 0 days.

(21) Appl. No.: 16/235,839

(22) Filed: Dec. 28, 2018

(65) Prior Publication Data
US 2019/0363929 A1 Nov. 28, 2019

(30) Foreign Application Priority Data
May 24, 2018 (EP) .................. 18174024

(51) Int. Cl.
*H04L 12/24* (2006.01)
*H04L 29/06* (2006.01)
(Continued)

(52) U.S. Cl.
CPC ...... *H04L 41/0663* (2013.01); *H04L 41/0668* (2013.01); *H04L 43/0852* (2013.01);
(Continued)

(58) Field of Classification Search
CPC .............. H04L 63/0876; H04L 67/141; G06F 17/3089; H04W 4/00
(Continued)

(56) References Cited

U.S. PATENT DOCUMENTS

| | | | | |
|---|---|---|---|---|
| 8,768,838 B1* | 7/2014 | Hoffman | ................ | G06Q 40/00 705/44 |
| 8,856,325 B2* | 10/2014 | Hansen | ................ | H04L 47/762 709/224 |

(Continued)

OTHER PUBLICATIONS

European Search Report dated Aug. 16, 2018, EP Patent Application No. 18174024.2, filed May 24, 2018, European Patent Office, 13 pages.
(Continued)

*Primary Examiner* — Iqbal Zaidi
(74) *Attorney, Agent, or Firm* — Mannava & Kang, P.C

(57) ABSTRACT

According to an example, with respect to a pluggable control system for fallback website access, a metric associated with operation of a primary interface may be ascertained for the primary interface that is configured to provide a third-party provider access to a website. The metric may be compared to a metric threshold. Based on a determination that the metric exceeds the metric threshold, an indication of a failure associated with the primary interface may be generated, and the access of the third-party provider may be switched from the primary interface to a fallback interface. Based on a determination that the metric is less than or equal to the corresponding metric threshold, the access of the third-party provider may be maintained using the primary interface. Further, operations between the third-party provider and the website may be controlled using the accessed primary interface or the accessed fallback interface.

19 Claims, 11 Drawing Sheets

(51) Int. Cl.
*H04L 12/26* (2006.01)
*H04L 29/08* (2006.01)

(52) U.S. Cl.
CPC .......... *H04L 43/16* (2013.01); *H04L 63/0823* (2013.01); *H04L 63/101* (2013.01); *H04L 63/108* (2013.01); *H04L 63/166* (2013.01); *H04L 67/025* (2013.01); *H04L 67/14* (2013.01); *H04L 67/20* (2013.01)

(58) Field of Classification Search
USPC ................. 370/252–339; 709/220–224, 318
See application file for complete search history.

(56) References Cited

U.S. PATENT DOCUMENTS

| | | | |
|---|---|---|---|
| 2005/0281191 A1 | 12/2005 | McGee et al. | |
| 2016/0086108 A1* | 3/2016 | Abelow ............... | G06Q 10/067 705/7.29 |

OTHER PUBLICATIONS

Anonymous, "Configuration—nginx failover without load balancing—Server Fault", Apr. 16, 2016, 1 page. https://web.archive.org/web/20160416031554/https://serverfault.com/questions/480241/nginx-failover-without-load-balancing.

Rick Nelson, "SSL Offloading, Encryption, and Certificates with NGINX", Apr. 30, 2014, 5 pages. https://www.nginx.com/blog/nginx-ssl/#gs.AvqB9Cw.

Anonymous, "TCP load balancing with Nginx (SSL Pass-thru)", Servers for Hackers, Aug. 28, 2017, 9 pages. https://web.archive.org/web/20170828083433/https://serversforhackers.com/c/tcp-load-balancing-with-nginx-ssl-pass-thru.

* cited by examiner

800

```
┌─────────────────────────────────────────────────────────────┐
│ ASCERTAIN FOR A PRIMARY INTERFACE THAT IS CONFIGURED TO     │
│ PROVIDE A THIRD-PARTY PROVIDER ACCESS TO A WEBSITE, AT      │
│ LEAST ONE METRIC ASSOCIATED WITH OPERATION OF THE PRIMARY   │
│                        INTERFACE                            │
│                           802                               │
└─────────────────────────────────────────────────────────────┘
                              ▼
┌─────────────────────────────────────────────────────────────┐
│    COMPARE THE AT LEAST ONE METRIC TO AT LEAST ONE          │
│         CORRESPONDING METRIC SPECIFICATION                  │
│                          804                                │
└─────────────────────────────────────────────────────────────┘
                              ▼
┌─────────────────────────────────────────────────────────────┐
│ BASED ON A DETERMINATION THAT THE AT LEAST ONE METRIC DOES  │
│   NOT MEET THE AT LEAST ONE CORRESPONDING METRIC            │
│   SPECIFICATION, GENERATE AN INDICATION OF A FAILURE        │
│ ASSOCIATED WITH THE PRIMARY INTERFACE, AND SWITCHING THE    │
│  ACCESS OF THE THIRD-PARTY PROVIDER TO THE WEBSITE FROM     │
│        THE PRIMARY INTERFACE TO A FALLBACK INTERFACE        │
│                          806                                │
└─────────────────────────────────────────────────────────────┘
                              ▼
┌─────────────────────────────────────────────────────────────┐
│    BASED ON A DETERMINATION THAT THE AT LEAST ONE METRIC    │
│  MEETS THE AT LEAST ONE CORRESPONDING METRIC SPECIFICATION, │
│   MAINTAIN THE ACCESS OF THE THIRD-PARTY PROVIDER TO THE    │
│          WEBSITE USING THE PRIMARY INTERFACE                │
│                          808                                │
└─────────────────────────────────────────────────────────────┘
                              ▼
┌─────────────────────────────────────────────────────────────┐
│  CONTROL, USING THE ACCESSED PRIMARY INTERFACE OR THE       │
│  ACCESSED FALLBACK INTERFACE, OPERATIONS BETWEEN THE        │
│  THIRD-PARTY PROVIDER AND THE WEBSITE BASED ON A            │
│  DETERMINATION OF WHETHER A COMMUNICATION SESSION           │
│  ASSOCIATED WITH THE WEBSITE INCLUDES A SERVER-BASED        │
│  TRANSPORT LAYER SECURITY AUTHENTICATION, OR A MUTUAL       │
│        TRANSPORT LAYER SECURITY AUTHENTICATION              │
│                          810                                │
└─────────────────────────────────────────────────────────────┘
```

*FIG. 8*

PLUGGABLE CONTROL SYSTEM FOR FALLBACK WEBSITE ACCESS

PRIORITY

This application claims priority to commonly assigned and co-pending European Patent Application Serial Number 18174024.2, filed May 24, 2018, the disclosure of which is hereby incorporated by reference in its entirety.

BACKGROUND

Access to a website by different entities may be controlled by various techniques. For example, one entity, such as a user, may be given access to one set of resources of a website, and another entity, such as another user, may be given access to another set of resources of the website. If accessibility by an entity fails, extensive resources and time may need to be expended to remedy the failure. Similarly, extensive resources and time may also need to be expended to control access to a website by different entities.

BRIEF DESCRIPTION OF DRAWINGS

Features of the present disclosure are illustrated by way of examples shown in the following figures. In the following figures, like numerals indicate like elements, in which

FIG. 8 illustrates a flowchart of a method for implementing a pluggable control system for fallback website access, according to an example of the present disclosure.

DETAILED DESCRIPTION

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Pluggable control systems for fallback website access, methods for implementing a pluggable control system for fallback website access, and non-transitory computer readable media having stored thereon machine readable instructions for implementing a pluggable control system for fallback website access are disclosed herein. The systems, methods, and non-transitory computer readable media disclosed herein provide a pluggable control system that may be plugged into, and co-deployed with an existing website, such as an Internet banking website, to implement access control with respect to the website, and contingency measures in the case of failure of a primary interface associated with the website, such as an "access-to-account" application programming interface associated with the Internet banking website.

Other examples of websites that may be subject to access control as disclosed in may include e-commerce websites, automobile retailer websites, and generally, any website where a consumer or an external entity may interact with the website. In this regard, and example implementation of the systems, methods, and non-transitory computer readable media is disclosed herein with respect to an Internet banking website. However, it should be understood in view of this disclosure that the systems, methods, and non-transitory computer readable media as disclosed herein may be implemented with other types of websites.

For the example of Internet banking, a third-party provider may need to access services such as payment services, payment accounts, and other types of features of an associated Internet banking website. Examples of third-party providers may include payment initiation services providers (PISPs), account information service providers (AISPs), and other such entities.

Figure 1:
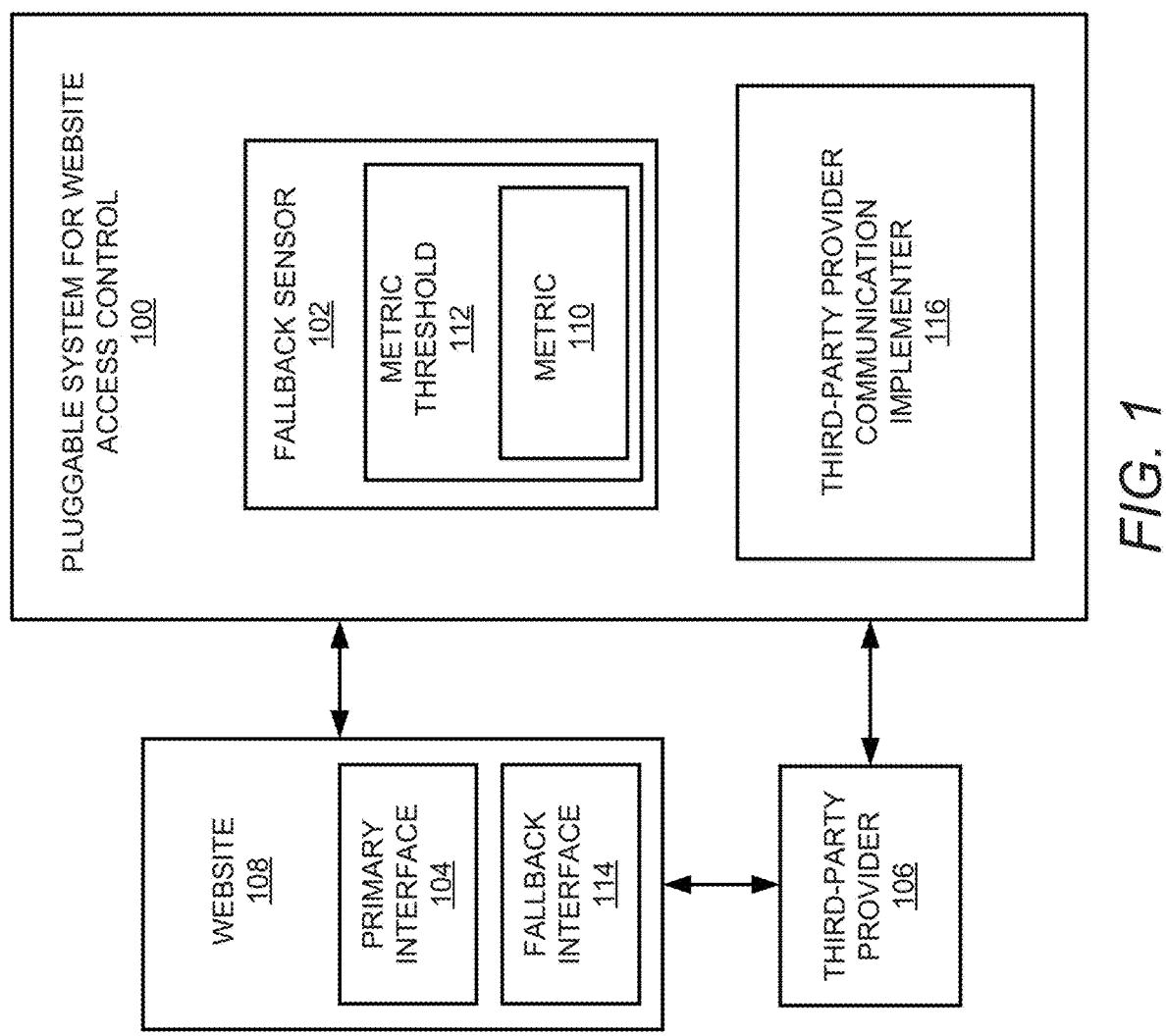
FIG. 1 illustrates an architecture of a pluggable control system for fallback website access, according to an example of the present disclosure.
Figure 2:
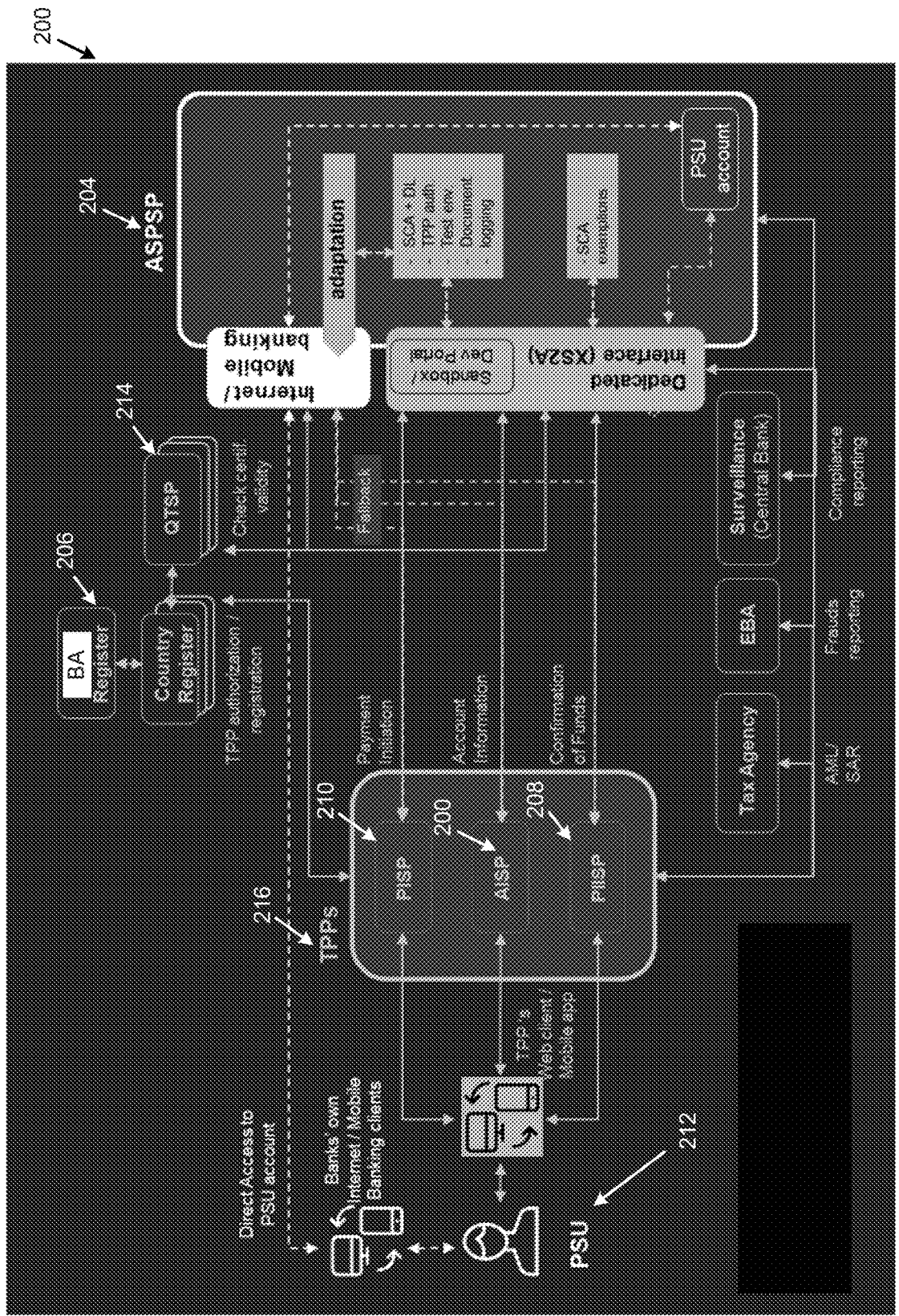
FIG. 2 illustrates an Internet banking website ecosystem to illustrate operation of the pluggable control system of FIG. 1, according to an example of the present disclosure.

According to an example, FIG. 2 illustrates an Internet banking website ecosystem 200 including access functionality by third-party providers to illustrate operation of the pluggable control system of FIG. 1, according to an example of the present disclosure.

The Internet banking website ecosystem 200 may include an account information service provider (AISP) 202 to provide information with respect to accounts or data aggregators. An account servicing payment service provider (ASPSP) 204 may provide and maintain a payment account for banks, a payer, e-money institutes (EMIs), or payment institutions (PIs). A banking authority (BA) 206 may provide a root register with information on all third-party providers in a specified area. A payment instrument issuer service provider (PIISP) 208 may utilize the service confirmation on the availability of funds. A payment initiation service provider (PISP) 210 may represent a payment service provider that offers payment initiation services. A payment service user (PSU) 212 may represent an end user of payments or payment information services. A qualified trusted service provider (QTSP) 214 may issue qualified certificates for electronic seals and/or qualified certificates for website authentication. The account information service provider 202, the payment instrument issuer service provider 208, and the payment initiation service provider 210 may represent third-party providers (TPPs) 216. An access to account (XS2A) 218 may represent an interface provided by an account servicing payment service provider 204 to a third-party provider 216 for accessing accounts.

For the Internet banking website ecosystem 200, in order for a website owner, such as a bank, to provide for access by third-party providers, a communication channel that allows third-party providers to access the data and payment services may need to be implemented. This communication channel may also enable a website owner and a third-party provider to identify each other when accessing user data, and to communicate through secure messaging.

Such a communication channel may be implemented by either adapting a user online banking interface, or by creating a new dedicated interface that will include all necessary information. If a dedicated interface is created, a contingency safeguard may also need to be implemented to ensure continuity of service. The contingency safeguard may be described as a fallback solution that would allow a third-party provider to perform, for example, web-scraping activities with respect to the Internet banking website.

With respect to direct adaptation of an existing customer online banking interface, a website owner may need to expend an extensive amount of effort on properly reconfiguring a consolidated information technology stack, in order to assured that the changes do not affect achieved levels of security, availability, and performances. Alternatively, if a new dedicated interface is created, for example by creating a duplicate website, the website owner may need to expend significant implementation costs, as well as duplication of maintenance efforts. Accordingly, it is technically challenging to implement a contingency safeguard to ensure continuity of service, without having to resort to direct adaptation of an existing user online banking interface and/or creating a duplicate website.

In order to address at least the aforementioned technical challenges associated with implementation of a contingency safeguard to ensure continuity of service, the systems, methods, and non-transitory computer readable media disclosed herein provide a pluggable control system that may be plugged into, and co-deployed with an existing website, such as an Internet banking website, to implement access control with respect to the website, and contingency measures (e.g., fallback) in the case of failure of a primary interface associated with the website, such as an "access-to-account" application programming interface associated with the Internet banking website. In this regard, a website owner may "plug" a self-contained hardware and software system as disclosed herein, while minimizing impact on an existing information technology infrastructure, and avoiding duplication of the information technology infrastructure.

The systems, methods, and non-transitory computer readable media disclosed herein provide further technical benefits such as improved computer resource management (e.g., more efficient use of processing power and/or memory), improved security, and improved computer network reliability. For example, the systems, methods, and non-transitory computer readable media disclosed herein provide the lowest possible amount of components to provide a service to end users, while maintaining security and consistency of data and identities. In this regard, the primary interface and the fallback interface as disclosed herein may represent service high availability components that provide for continued service with respect to a website as disclosed herein. The systems, methods, and non-transitory computer readable media disclosed herein provide improved computer resource management in that resources may be utilized for implementation of the primary interface and the fallback interface as disclosed herein, instead of the need to implement a duplicate website, or to modify the existing configuration and security rules for an existing website. The systems, methods, and non-transitory computer readable media disclosed herein provide improved security and improved computer network reliability in that in the event of the primary interface failure, transactions with respect to a website, such as an Internet banking website, may securely and reliably continue with respect to the fallback interface. For example, for the systems, methods, and non-transitory computer readable media disclosed herein, the implementation of the primary and fallback interfaces as disclosed herein may provide alternative access to services of an Internet banking website based on reduced resources as the components include a relatively small compute footprint (e.g., transport layer security reverse proxy as disclosed herein). The implementation of the primary and fallback interfaces as disclosed herein may further provide improved security, for example, based on the technical differences in the features of the primary and fallback interfaces. In this regard, if the primary interface is detected as being compromised, for example, by a hacker, access to services provided by the website may be switched to the fallback interface, which would require a different approach for the hacker to compromise the access provided by the fallback interface. The primary and fallback interfaces may further provide improved computer network reliability in that the fallback interface may be maintained on a different network compared to the primary interface, thus reducing the possibility that a network outage may result in complete service disruption.

Examples of applications of the systems, methods, and non-transitory computer readable media disclosed herein may include website owners that prefer to provide an "adapted Internet banking" interface to third-party providers (e.g., instead of setting up a dedicated interface), thus minimizing information technology compliance efforts.

Other examples of applications of the systems, methods, and non-transitory computer readable media disclosed herein may include a website owner that may set up a dedicated interface, but may also provide a fallback solution in the event of the dedicated interface failure.

The systems, methods, and non-transitory computer readable media disclosed herein may provide third-party provider authentication, transaction monitoring, interface documentation, an interface sandbox and testing environment, logging, and security. According to examples disclosed herein, the features such as transaction monitoring, interface documentation, and the interface sandbox and testing environment may be utilized when the systems, methods, and non-transitory computer readable media disclosed herein are utilized as a primary interface.

Implementation of the systems, methods, and non-transitory computer readable media disclosed herein may eliminate the need for a website owner to create a duplicate website, or to modify the existing configuration and security rules for the website owner's Internet banking website.

Implementation of the systems, methods, and non-transitory computer readable media disclosed herein may provide for determination of the need to switch to a third-party provider communication implementer as disclosed herein, and hence to build dynamic applications with different software development kits to maintain the user experience as much as possible unchanged between a set of application programming interfaces, and the fallback scenarios as disclosed herein.

The systems, methods, and non-transitory computer readable media disclosed herein may be plugged into any environment such as, for example, a public cloud, a physical or private cloud, etc., to allow a website owner to manage its current ecosystem with no restrictions in terms of future architectural approaches.

The systems, methods, and non-transitory computer readable media disclosed herein may be integrated with an existing security and threat management solution of a website owner, to thus provide a single management solution with respect to an integrated website.

In the event of a dedicated interface failure detection, the systems, methods, and non-transitory computer readable media disclosed herein may provide for automated switching, to thus reduce operational costs associated with a website.

In some examples, elements of the pluggable control system for fallback website access may be machine readable instructions stored on a non-transitory computer readable medium. In this regard, the pluggable control system for fallback website access may include or be a non-transitory computer readable medium. In some examples, the elements of the pluggable control system for fallback website access may be hardware or a combination of machine readable instructions and hardware.

FIG. 1 illustrates an architecture of a pluggable control system 100 for fallback website access (hereinafter "system 100"), according to an example of the present disclosure.

Referring to FIG. 1, the system 100 may include a fallback sensor 102 that is executed by at least one hardware processor (e.g., the hardware processor 702 of FIG. 7, and/or the hardware processor 904 of FIG. 9) to ascertain, for a primary interface 104 that is configured to provide a third-party provider 106 access to a website 108, at least one metric 110 associated with operation of the primary interface 104.

According to examples disclosed herein, the website 108 may include an Internet banking website.

According to examples disclosed herein, the primary interface 104 may include an access-to-account application programming interface of the Internet banking website.

According to examples disclosed herein, the at least one metric 110 may include a response time, a percentage of incorrect responses within a specified time duration, and other such factors associated with communication with the website 108. These factors may represent resource consumption drifts affecting user experience. In this regard, the primary interface 104 may need to be discontinued due to such factors affecting the user experience, and/or to allow deployment activities.

The fallback sensor 102 may compare the at least one metric 110 to at least one corresponding metric threshold 112. Based on a determination that the at least one metric 110 exceeds the at least one corresponding metric threshold 112 (e.g., does not meet a requirement associated with the at least one metric 110), the fallback sensor 102 may generate an indication of a failure associated with the primary interface 104. Further, the fallback sensor 102 may switch the access of the third-party provider 106 to the website 108 from the primary interface 104 to a fallback interface 114.

The fallback interface 114 may be implemented using different technical standards compared to the primary interface 104. For example, the fallback interface 114 may be implemented as a controlled Hypertext Transfer Protocol (HTTP) access to a subset of web pages and functionalities of the website 108, where the third-party provider 106 may acquire payment service user relevant data. Comparably, the primary interface 104 may be implemented as an application programming interface service layer, which may be exposed to the third-party provider 106 by a specific integration protocol, such as JavaScript Object Notation (JSON) Representational State Transfer (REST), or Simple Object Access Protocol (SOAP) over HTTP.

The primary interface 104 may be subject to resource consumption drifts, which may affect user experience. In this regard, the fallback interface 114 may address such resource consumption drifts associated with the primary interface 104. For example, in order to minimize the architectural changes of an Internet banking application, the primary interface 104 may introduce an additional application programming interface layer built on top of an existing service exposure layer of the Internet banking website. Thus, the primary interface 104 may represent an additional architectural component which may increase resource consumption, and provide an additional potential point of failure in the architecture. For example, since an application programming interface manager may include a database, in case of too much traffic or too long-lived tokens, it may happen that queries to the database take a longer time, which may cause a timeout of the connection. In this regard, the fallback interface 114 may leverage a lightweight network component (e.g., as disclosed herein with respect to transport layer security reverse proxy). Thus, the fallback interface 114 may forego this application complexity, and may further forego any significant maintenance requirements compared to the primary interface application programming interface layer.

With respect to the aforementioned comparison of the at least one metric 110 to the at least one corresponding metric threshold 112, based on a determination that the at least one metric 110 is less than or equal to the at least one corresponding metric threshold 112 (e.g., meets a requirement associated with the at least one metric 110), the fallback sensor 102 may maintain the access of the third-party provider 106 to the website 108 using the primary interface 104.

A third-party provider communication implementer 116 that is executed by at least one hardware processor (e.g., the hardware processor 702 of FIG. 7, and/or the hardware processor 904 of FIG. 9) may control, using the accessed primary interface 104 or the accessed fallback interface 114, operations between the third-party provider 106 and the website 108.

According to examples disclosed herein, the fallback sensor 102 and the third-party provider communication implementer 116 may be included in a self-contained unit that is to be plugged into the website 108 to operate with the website 108.

According to examples disclosed herein, the third-party provider communication implementer 116 may control, using the accessed primary interface 104 or the accessed fallback interface 114, operations between the third-party provider 106 and the website 108 by determining whether a communication session associated with the website 108 includes a server-based transport layer security authentication or a mutual transport layer security authentication. Based on a determination that the communication session associated with the website 108 includes the server-based transport layer security authentication, the third-party provider communication implementer 116 may identify, using a transport layer security reverse proxy, the communication session as a direct channel session, and proxy, to the website 108, the direct channel session as a server-based transport layer security authentication session.

Alternatively, based on a determination that the communication session associated with the website 108 includes the mutual transport layer security authentication, the third-party provider communication implementer 116 may identify, using a transport layer security reverse proxy, the communication session as a third-party provider session. Further, the third-party provider communication implementer 116 may authenticate, by using a certificate, the third-party provider 106 associated with the third-party provider session. Based on the authentication of the third-party provider 106, the third-party provider communication implementer 116 may terminate the third-party provider session, and initiate, with the website 108, a new session as a server-only authentication session.

With respect to the mutual transport layer security authentication, the third-party provider communication implementer 116 may determine whether the third-party provider 106 is included in a third-party provider blacklist. Based on the authentication of the third-party provider 106, and further, based on a determination that the third-party provider 106 is not included in the third-party provider blacklist, the third-party provider communication implementer 116 may terminate the third-party provider session, and initiate, with the website 108, a new session as a server-only authentication session.

According to examples disclosed herein, the third-party provider communication implementer 116 may determine, for a specified time duration (e.g., 1 hour, 1 day, etc.), a number of times the third-party provider 106 has accessed the website 108. Based on a determination that the number of times the third-party provider 106 has accessed the website 108 exceeds a third-party provider access threshold (e.g., 5 accesses, 10 accesses, etc.), the third-party provider communication implementer 116 may restrict, during the specified time duration, further access to the website 108 by third-party provider 106.

Figure 3:
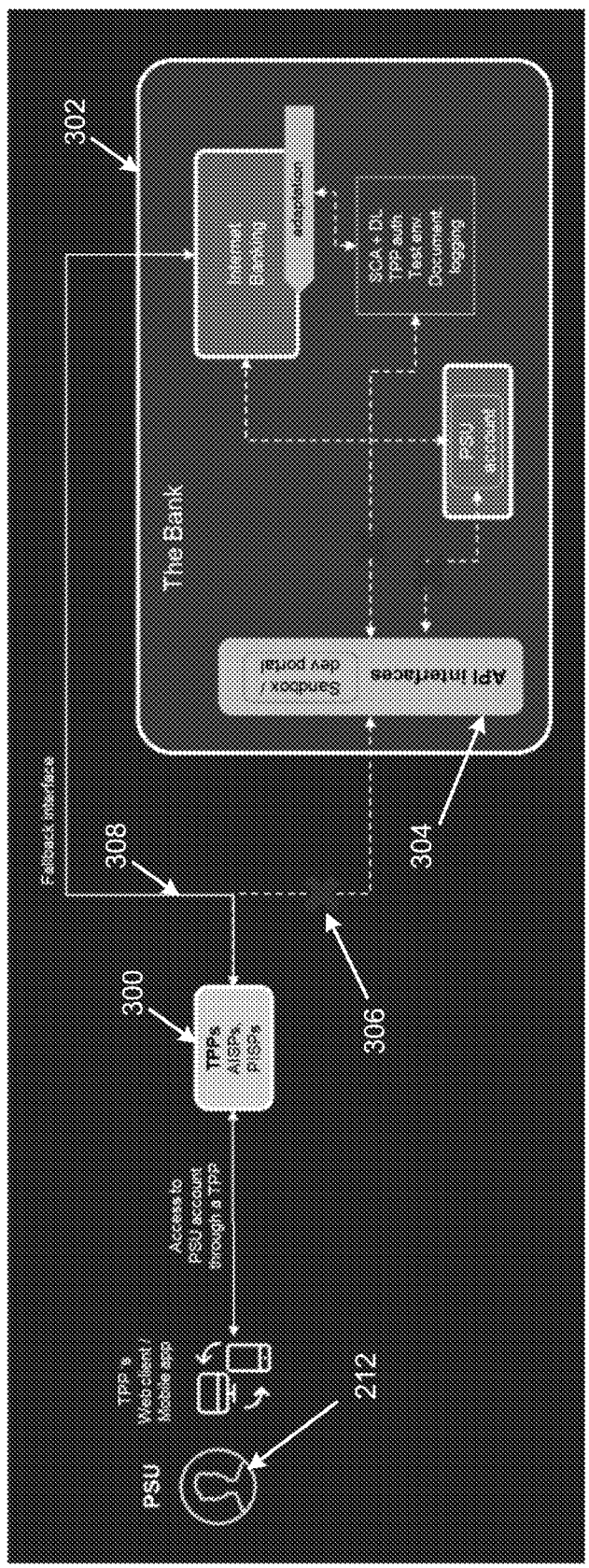
FIG. 3 illustrates a fallback requirement for an example of an Internet banking system to illustrate operation of the pluggable control system of FIG. 1, according to an example of the present disclosure.

FIG. 3 illustrates a fallback requirement for an example of an Internet banking system to illustrate operation of the pluggable control system 100, according to an example of the present disclosure.

Referring to FIG. 3, third-party providers at 300 may communicate with an Internet banking website 302 via the application programming interfaces 304 (e.g., the primary interface 104). In the event of failure, as shown at 306, associated with the application programming interfaces 304, a fallback interface at 308 (e.g., the fallback interface 114) may be implemented to provide a contingency safeguard as disclosed herein.

Figure 4:
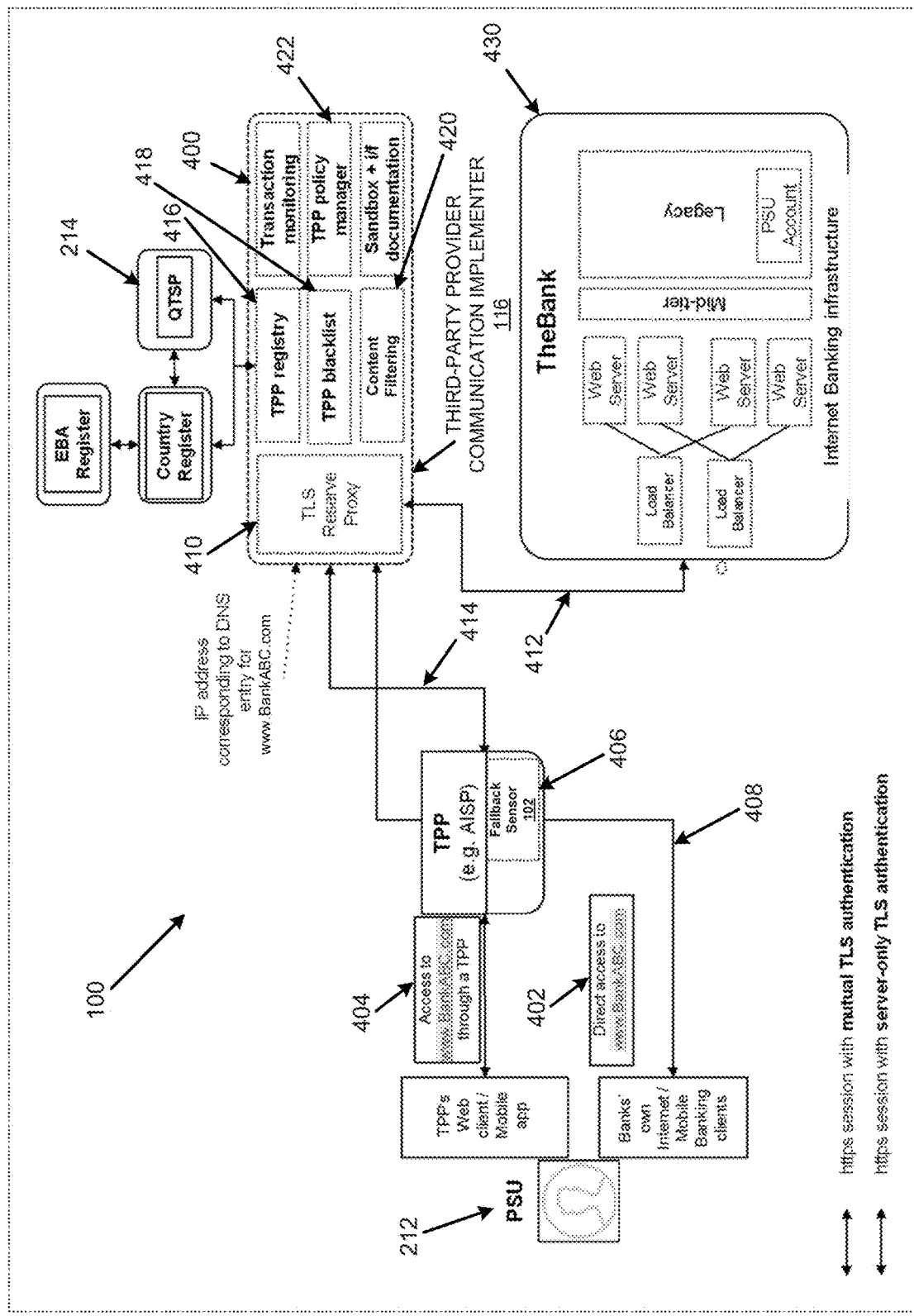
FIG. 4 illustrates further details of the architecture of the pluggable control system of FIG. 1, according to an example of the present disclosure.

FIG. 4 illustrates further details of the architecture of the pluggable control system 100, according to an example of the present disclosure.

Referring to FIG. 4, as disclosed herein, the pluggable control system 100 may define a set of components that may be plugged into, and co-deployed with an existing Internet banking infrastructure, such as the infrastructure 200 of FIG. 2, in order to implement access control with respect to the website, and/or contingency measures in case of failures, for example, of the main "access-to-account" application programming interface. Implementation of the system 100 may minimize changes to an existing website, such as the Internet banking website illustrated in FIG. 4. In this regard, certain features of the system 100 as illustrated at 400 may be implemented on top of an existing website, such as the Internet banking website illustrated in FIG. 4, with a domain name system change to a production environment of an existing Internet banking system. In this regard, for an Internet banking system that includes a domain name system hostname, for example, of www.BankABC.com, this domain name system hostname may be changed to the Internet protocol address of the third-party provider communication implementer 116 of the system 100. Thus, as shown at 402, the third-party provider communication implementer 116 may become the endpoint for all inbound web requests originated by end users directly accessing the Internet banking website through web browsers, or, as shown at 404, by end users indirectly accessing the Internet banking website through third-party providers.

As shown at 406, the fallback sensor 102 may detect a need to switch to the fallback interface (e.g., as disclosed herein with respect to FIGS. 1 and 3). According to an example, the fallback sensor 102 may be plugged in on a client side at a third-party provider level. The fallback sensor 102 may monitor application programming interfaces associated with a website 108 (e.g., the Internet banking website 430), and determine whether they are operating correctly, or whether a switch to the fallback interface is needed. The fallback sensor information may be made available to third-party providers and/or to mobile clients which may then switch to the fallback service provided by the third-party provider communication implementer 116.

The system 100 may manage either the payment service user 212 accessing from various channels of the website owner, or accessing from a third-party provider 106 as follows.

The following use case may represent a payment service user accessing the Internet banking website 430 from a website owner's channels. In this regard, as discussed above with respect to FIG. 1, based on a determination that the communication session associated with the website 108 (e.g., the Internet banking website 430) includes the server-based transport layer security authentication, the third-party provider communication implementer 116 may identify, using a transport layer security reverse proxy, the communication session as a direct channel session, and proxy, to the website 108, the direct channel session as a server-based transport layer security authentication session.

For example, at 402, for the use case of a payment service user accessing the Internet banking website 430 from a website owner's channels, the user may enter, for example, www.BankABC.com on the user's web, or open a mobile application associated with the Internet banking website.

At 408, an Hypertext Transfer Protocol Secure (HTTPS) session with server-based transport layer security (TLS) authentication may be initiated between the client and third-party provider communication implementer 116 server.

At 410, the transport layer security reverse proxy may identify and log the session as a «human client» session.

At 412, the HTTPS session may be proxied (as a server-authenticated session) to the load balancer and the Internet banking infrastructure of the website owner.

Compared to the aforementioned use case that represents a payment service user accessing the Internet banking website from a website owner's channels, the following use case may represent a payment service user accessing the Internet banking website from a third-party provider. In this regard, as discussed above, based on a determination that the communication session associated with the website 108 (e.g., the Internet banking website 430) includes the mutual transport layer security authentication, the third-party provider communication implementer 116 may identify, using a transport layer security reverse proxy, the communication session as a third-party provider session. Further, the third-party provider communication implementer 116 may authenticate, by using a certificate, the third-party provider 106 associated with the third-party provider session. Based on the authentication of the third-party provider 106, the third-party provider communication implementer 116 may terminate the third-party provider session, and initiate, with the website 108, a new session as a server-only authentication session.

For example, at 404, for the use case of a payment service user accessing the Internet banking website from a third-party provider, a user may enter, for example, www.Bank-ABC.com on the user's third-party provider client, or may open the user's third-party provider application.

At 414, an HTTPS session with mutual transport layer security authentication may be initiated between the third-party provider and third-party provider communication implementer 116 server.

At 410, for the use case of a payment service user accessing the Internet banking website from a third-party provider, the transport layer security reverse proxy may identify and log the session as a «TPP client» session.

At 416, that third-party provider may be authenticated based, for example, on an electronic identification certificate stored on the third-party provider registry or retrieved from a qualified trusted service provider at 214.

At 418, the third-party provider may be verified against a blacklist. For example, the third-party provider may be verified to determine whether the third-party provider has rights to access the Internet banking website 430.

At 420, the uniform resource identifier (URI) requested by the client may be analyzed to verify that the requested resource and uniform resource identifier is a data or service that is allowed.

At 422, third-party provider HTTP requests may be segregated in order to isolate this traffic, and apply any exemption upon a user access policy (e.g., strong customer authentication).

At 412, for the use case of a payment service user accessing the Internet banking website from a third-party provider, the HTTPS session may be terminated at the third-party provider communication implementer 116 server. Further, a new HTTPS session with server-only authentication may be initiated with the LB/the Internet banking infrastructure of the website owner.

Figure 5:
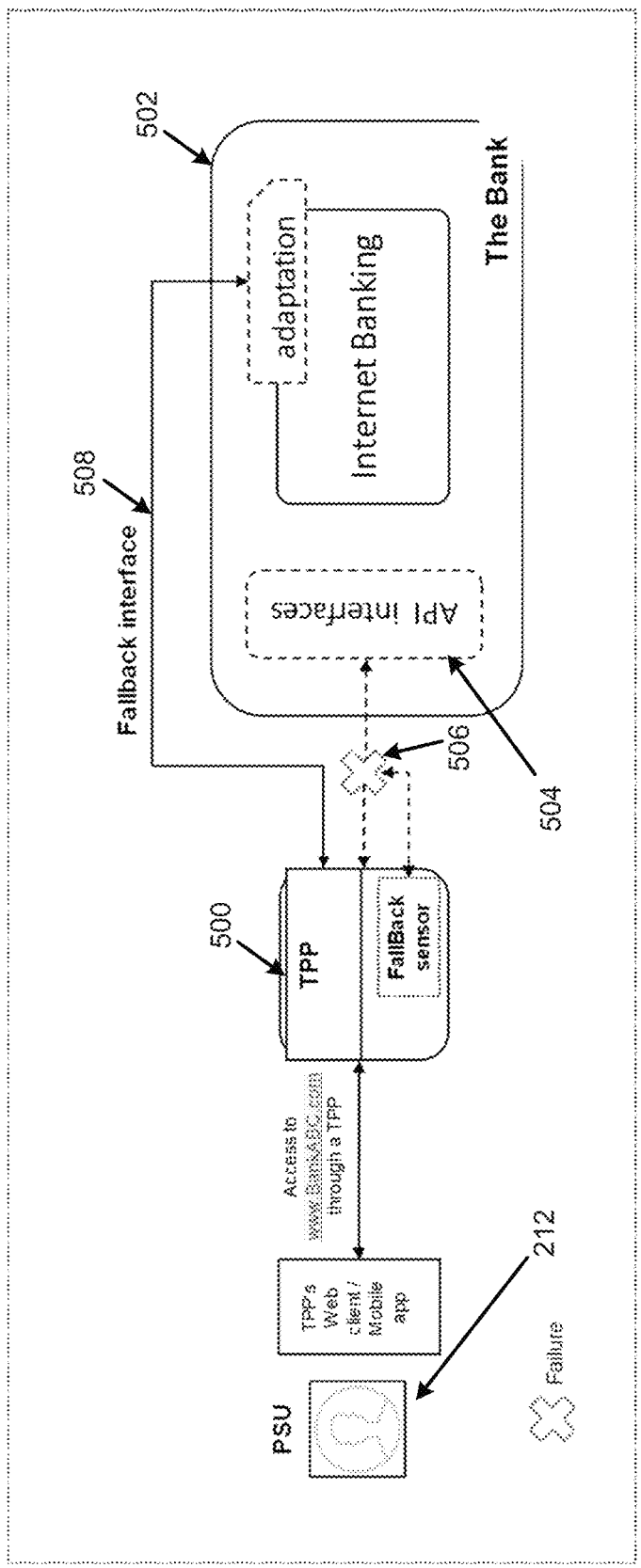
FIG. 5 illustrates details of an architecture of a fallback sensor of the pluggable control system of FIG. 1, according to an example of the present disclosure.

FIG. 5 illustrates details of an architecture of a fallback sensor of the pluggable control system 100, according to an example of the present disclosure.

Referring to FIG. 5, in a similar manner as disclosed herein with respect to FIG. 3, third-party providers at 500 may communicate with an Internet banking website 502 (e.g., the website 108) via the application programming interfaces 504 (e.g., the primary interface 104). In the event of failure, as shown at 506, associated with the application programming interfaces 504, the fallback interface at 508 (e.g., the fallback interface 114) may be implemented to provide a contingency safeguard as disclosed herein.

Figure 6:
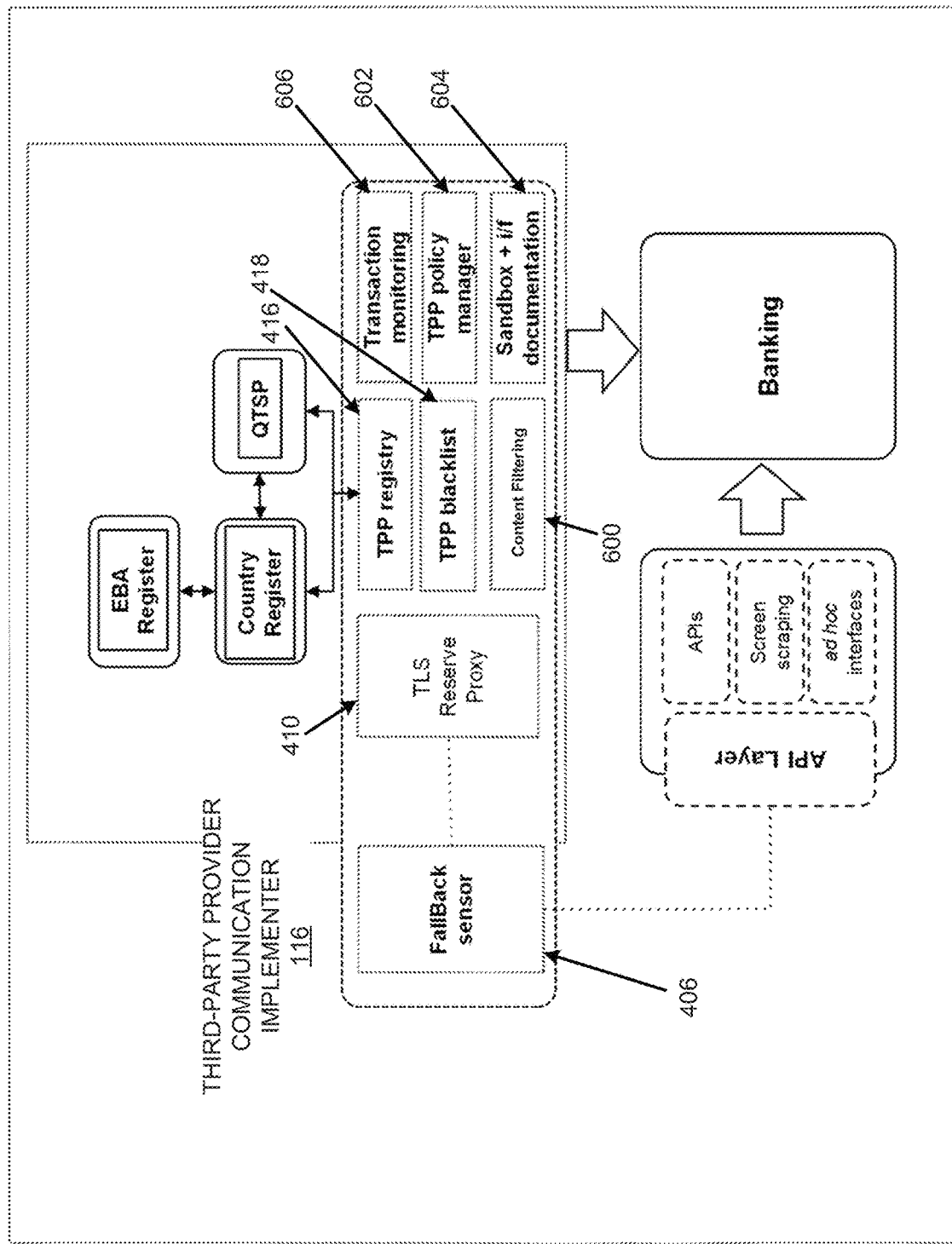
FIG. 6 illustrates further details of components of the pluggable control system of FIG. 1, according to an example of the present disclosure.

FIG. 6 illustrates further details of components of the pluggable control system 100, according to an example of the present disclosure.

Referring to FIGS. 4 and 6, the transport layer security reverse proxy at 410 may be accessed via a public Internet protocol address, associated with the domain name system name of the website owner internet banking address (e.g.: www.BankABC.com=192.1.0.200). The transport layer security reverse proxy at 410 may analyze each incoming HTTP request, and identify the need of mutual authentication based on source endpoints/domains representing the third-party providers. The transport layer security reverse proxy at 410 may forward the request to the existing Internet banking servers ensuring the encryption. For example, the transport layer security reverse proxy at 410 may enable the decryption of transport layer security and secure sockets layer to identify one of the use cases specified above. The transport layer security reverse proxy at 410 may provide certificates (e.g., bank certificates) to a client, which may correspond to the use case of a payment service user accessing the Internet banking website from a website owner's channels. The transport layer security reverse proxy at 410 may re-encrypt the traffic, and perform an HTTP redirect to the existing internet banking infrastructure. The transport layer security reverse proxy at 410 may handle server-to-server transport layer security mutual authentication (according to the relevant use cases described above). The transport layer security reverse proxy at 410 may filter allowed endpoints through a whitelist configuration (according to the relevant use cases described above). Further, the transport layer security reverse proxy at 410 may filter allowed sources through a whitelist configuration (according to the relevant use cases described above).

The third-party protocol registry at 416 may maintain the configuration (e.g., database) of third-party providers address and domains that allows how to process the HTTP requests. In this case, the third-party protocol registry at 416 may require a third-party provider to start the mutual authentication process. Further, the third-party protocol registry at 416 and the third-party provider 106 may exchange and verify the authenticated key messages. The third-party protocol registry at 416 may perform mutual authentication of certificates, for example, for the use case of a payment service user accessing the Internet banking website from a third-party provider 106.

The content filtering at 600 may provide the third-party provider access to the Internet banking web resources (e.g., web pages that the website owner considers available to third-party providers). In this regard, as discussed above, the third-party provider communication implementer 116 may determine, for a specified time duration (e.g., 1 hour, 1 day, etc.), a number of times the third-party provider 106 has accessed the website 108. Based on a determination that the number of times the third-party provider 106 has accessed the website 108 exceeds a third-party provider access threshold (e.g., 5 accesses, 10 accesses, etc.), the third-party provider communication implementer 116 may restrict, during the specified time duration, further access to the website 108 by third-party provider 106. For example, website owner may limit the daily number of accesses for each third-party provider. In order to enforce access control to third-party providers, the content filtering at 600 may be used to store third-party provider access thresholds in a configuration table, and compare the third-party provider access thresholds with the actual number of accesses. The content filtering at 600 may operate as a first static filter of the allowed web resources on top of the third-party provider policy manager at 602. In this regard, the list of allowed web resources may be statically configured in a database.

The functionalities of content filtering may be performed by either the transport layer security reverse proxy or the integration with identity and access management (IAM) system of an entity such as a bank.

The content filtering at 600 may provide third-party providers with a selective access to Internet banking resources, with respect to the use case of a payment service user accessing the Internet banking website from a third-party provider 106. Further, the content filtering at 600 may enforce access control to guarantee the number of third-party provider accesses in compliance with a specified threshold, with respect to the use case of a payment service user accessing the Internet banking website from a third-party provider.

The sandbox and interface documentation at 604 may provide a sandbox environment that isolates a test environment from a production environment. The interface documentation may represent a way to properly document an interface for integration purposes (e.g., a service contract). In this regard, sandboxing may protect production servers and their data. The sandbox and i/f documentation at 604 may provide test environment and interface documentation, for example with respect to the use case of a payment service user accessing the Internet banking website from a third-party provider.

Transaction monitoring at 606 may collect statistics of third-party providers access by the configuration of the reverse proxy. Examples of statistics may include a number of incoming requests, a number of bytes, server uptime, the time the server was started/restarted, and other such statistics. In this regard, by the integration of application performance monitoring tool, detailed statistics on each transaction may be available. An example of a detailed statistic may include response times on Internet banking resources. The transaction monitoring at 606 may provide data related to the service usage such as source Internet protocol, endpoints visited, registered response time on service side, and other such data.

As disclosed above, with respect to the mutual transport layer security authentication, the third-party provider communication implementer 116 may determine whether the third-party provider 106 is included in a third-party provider blacklist. Based on the authentication of the third-party provider 106, and further, based on a determination that the third-party provider 106 is not included in the third-party provider blacklist, the third-party provider communication implementer 116 may terminate the third-party provider session, and initiate, with the website 108, a new session as a server-only authentication session. For example, the third-party provider blacklist at 418 may store the list of blacklisted third-party providers (e.g., database entries of third-party providers not allowed into Internet banking). The third-party provider blacklist at 418 may be used to check source Internet protocol and domain, and deny access if a third-party provider is blacklisted.

The third-party provider policy manager at 602 may operate as a traffic segregation component that provides for the determination of the source of traffic applying both source Internet Protocol and virtual hosts logic. The third-party provider policy manager at 602 may apply the related logic to the application programming interfaces in terms of traffic routing, header enrichment, and matching of the website owner's business logic. The third-party provider policy manager at 602 may identify the source Internet Protocol of requests, and the virtual host of the requests. The third-party provider policy manager at 602 may manage traffic routing to the most appropriate internal application programming interface. The third-party provider policy manager at 602 may manage the header enrichment to trigger the most appropriate business logic. The third-party provider policy manager at 602 may manage the creation of different routing flows in order to match a website owner's requirements.

The fallback sensor at 406 (e.g., the fallback sensor 102) may monitor application programming interfaces, and determine whether the service is working or not based, for example, on configurable service level agreements such as response time, percentage of unexpected/wrong responses within a certain timeframe, availability of key relevance application programming interfaces, and other such factors. The fallback sensor at 406 may be plugged into the website owner application programming interface manager by polling the application programming interfaces, and producing metrics (e.g., the metric 110) to be compared with predefined service level agreements (the metric threshold 112). Through the integration with the third-party provider registry at 416, the fallback sensor at 406 may provide the fault notification to the impacted third-party providers.

The fallback sensor at 406 may monitor application programming interfaces. In the case of a fault, the fallback sensor at 406 may provide to the third-party provider and/or the end users' clients a return message at the beginning of session. This message may allow the third-party provider and client to switch from a given application programming interface (e.g., the primary interface 104) to the fallback interface 114.

Figure 7:
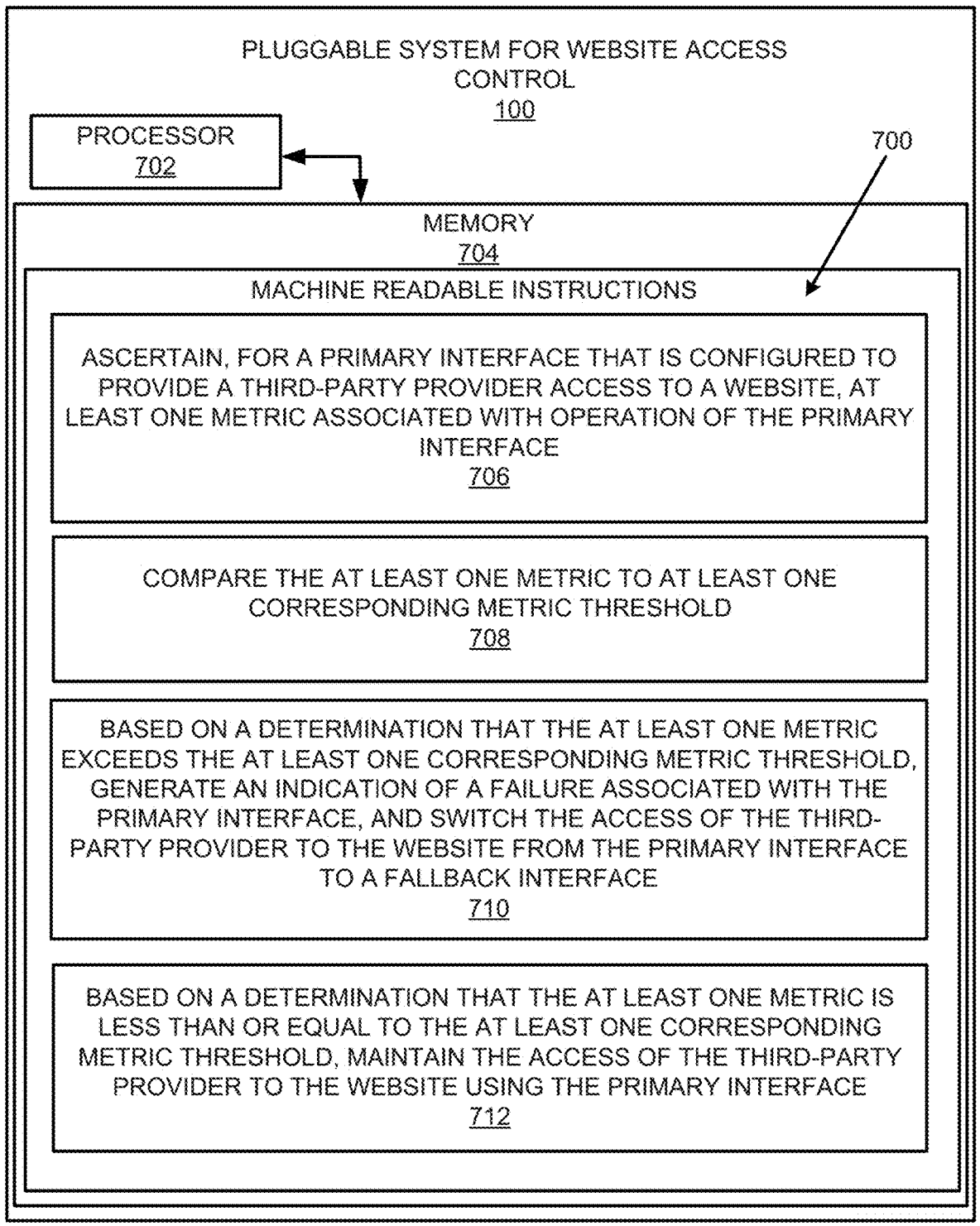
FIG. 7 illustrates a block diagram for implementing a pluggable control system for fallback website access, according to an example of the present disclosure.
Figure 7:
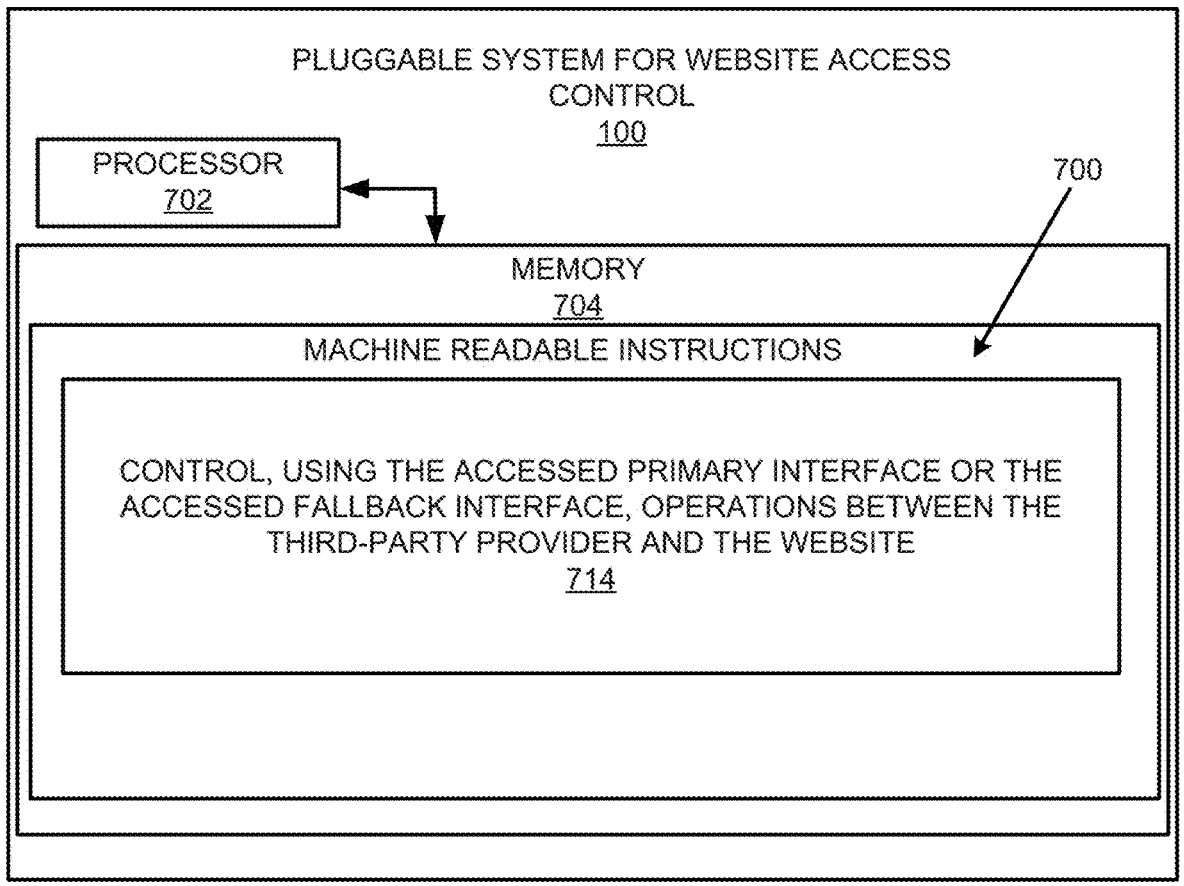
Figure 9:
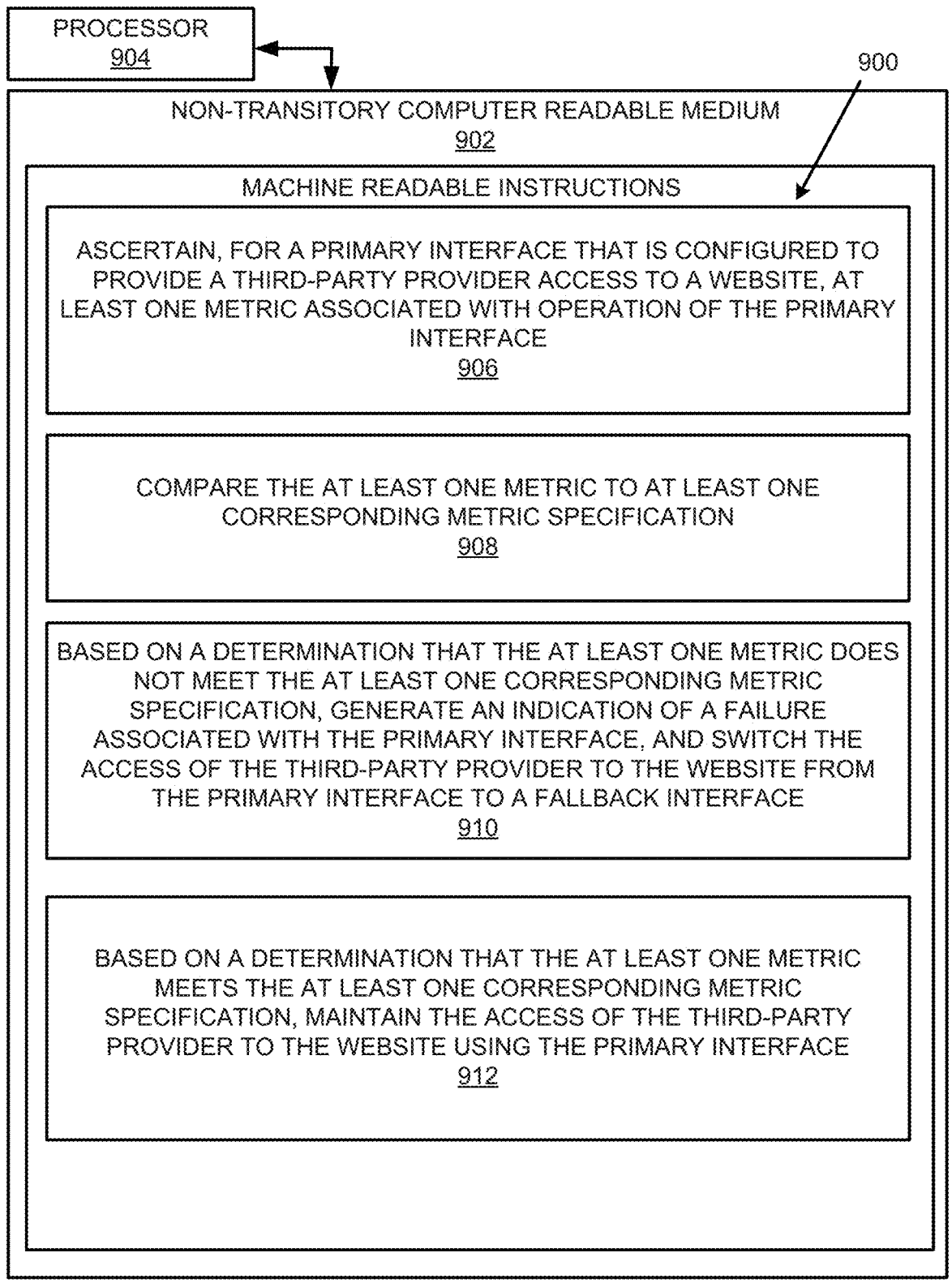
FIG. 9 illustrates a further block diagram for implementing a pluggable control system for fallback website access, according to an example of the present disclosure.
Figure 9:
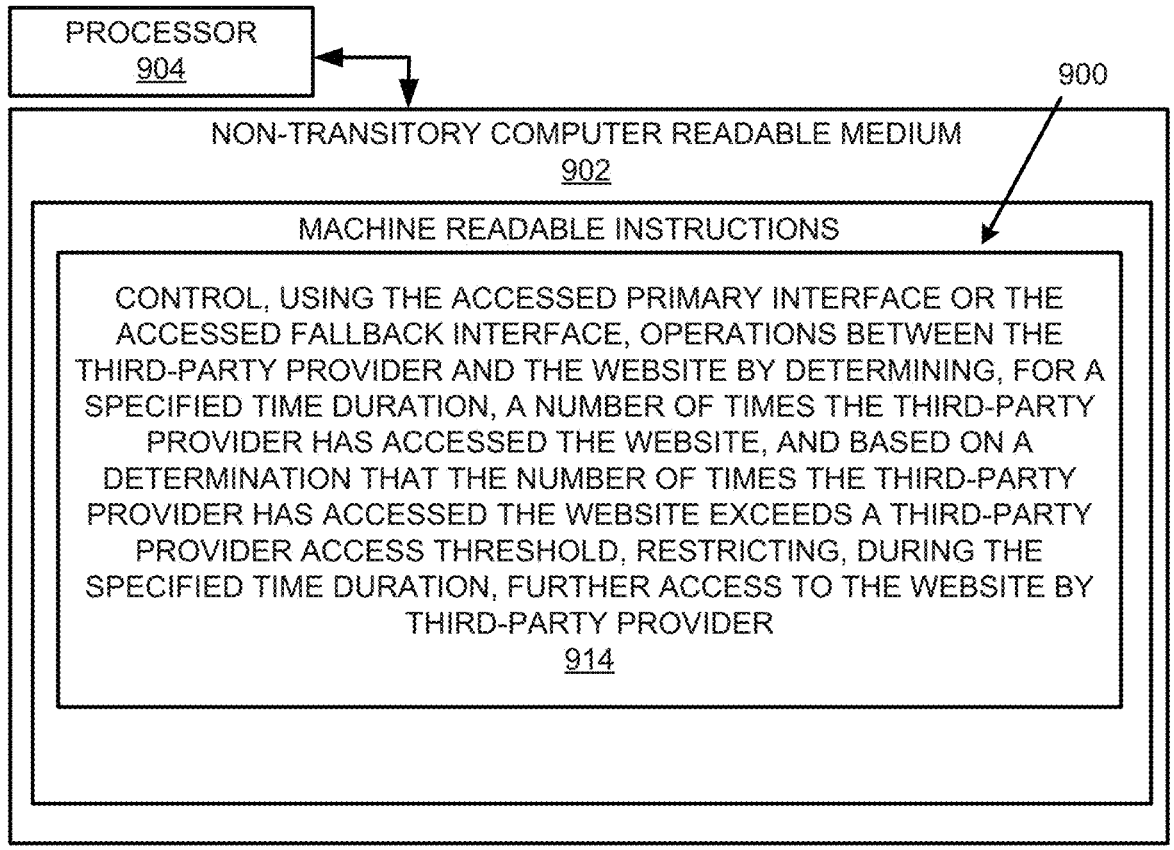

FIGS. 7-9 respectively illustrate a block diagram 700, a flowchart of a method 800, and a further block diagram 900 for a pluggable control system for fallback website access, according to examples. The block diagram 700, the method 800, and the block diagram 900 may be implemented on the system 100 described above with reference to FIG. 1 by way of example and not limitation. The block diagram 700, the method 800, and the block diagram 900 may be practiced in other systems. In addition to showing the block diagram 700, FIG. 7 shows hardware of the system 100 that may execute the instructions of the block diagram 700. The hardware may include a processor 702, and a memory 704 storing machine readable instructions that when executed by the processor cause the processor to perform the instructions of the block diagram 700. The memory 704 may represent a non-transitory computer readable medium. FIG. 8 may represent a method for implementing a pluggable control system for fallback website access, and the steps of the method. FIG. 9 may represent a non-transitory computer readable medium 902 having stored thereon machine readable instructions to provide a pluggable control system for fallback website access. The machine readable instructions, when executed, cause a processor 904 to perform the instructions of the block diagram 900 also shown in FIG. 9.

The processor 702 of FIG. 7 and/or the processor 904 of FIG. 9 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 902 of FIG. 9), such as hardware storage devices (e.g., RAM (random access memory), ROM (read only memory), EPROM (erasable, programmable ROM), EEPROM (electrically erasable, programmable ROM), hard drives, and flash memory). The memory 704 may include a RAM, where the machine readable instructions and data for a processor may reside during runtime.

Referring to FIGS. 1-7, and particularly to the block diagram 700 shown in FIG. 7, the memory 704 may include instructions 706 to ascertain, for a primary interface 104 that is configured to provide a third-party provider 106 access to a website 108, at least one metric 110 associated with operation of the primary interface 104.

The processor 702 may fetch, decode, and execute the instructions 708 to compare the at least one metric 110 to at least one corresponding metric threshold 112.

Based on a determination that the at least one metric 110 exceeds the at least one corresponding metric threshold 112, the processor 702 may fetch, decode, and execute the instructions 710 to generate an indication of a failure associated with the primary interface 104, and switch the access of the third-party provider 106 to the website 108 from the primary interface 104 to a fallback interface 114.

Based on a determination that the at least one metric 110 is less than or equal to the at least one corresponding metric threshold 112, the processor 702 may fetch, decode, and execute the instructions 712 to maintain the access of the third-party provider 106 to the website 108 using the primary interface 104.

The processor 702 may fetch, decode, and execute the instructions 714 to control, using the accessed primary interface 104 or the accessed fallback interface 114, operations between the third-party provider 106 and the website 108.

Referring to FIGS. 1-6 and 8, and particularly FIG. 8, for the method 800, at block 802, the method may include ascertaining, by at least one processor, for a primary interface 104 that is configured to provide a third-party provider 106 access to a website 108, at least one metric 110 associated with operation of the primary interface 104.

At block 804, the method may include comparing, by the at least one processor, the at least one metric 110 to at least one corresponding metric specification.

Based on a determination, by the at least one processor, that the at least one metric 110 does not meet the at least one corresponding metric specification, at block 806, the method may include generating, by the at least one processor, an indication of a failure associated with the primary interface 104, and switching, by the at least one processor, the access of the third-party provider 106 to the website 108 from the primary interface 104 to a fallback interface 114.

Based on a determination, by the at least one processor, that the at least one metric 110 meets the at least one corresponding metric specification, at block 808, the method may include maintaining, by the at least one processor, the access of the third-party provider 106 to the website 108 using the primary interface 104.

At block 810, the method may include controlling, by the at least one processor and using the accessed primary interface 104 or the accessed fallback interface 114, operations between the third-party provider 106 and the website 108 based on a determination of whether a communication session associated with the website 108 includes a server-based transport layer security authentication, or a mutual transport layer security authentication.

Referring to FIGS. 1-6 and 9, and particularly FIG. 9, for the block diagram 900, the non-transitory computer readable medium 902 may include instructions 906 to ascertain, for a primary interface 104 that is configured to provide a third-party provider 106 access to a website 108, at least one metric 110 associated with operation of the primary interface 104.

The processor 904 may fetch, decode, and execute the instructions 908 to compare the at least one metric 110 to at least one corresponding metric specification.

Based on a determination that the at least one metric 110 does not meet the at least one corresponding metric specification, the processor 904 may fetch, decode, and execute the instructions 910 to generate an indication of a failure associated with the primary interface 104, and switch the access of the third-party provider 106 to the website 108 from the primary interface 104 to a fallback interface 114.

Based on a determination that the at least one metric 110 meets the at least one corresponding metric specification, the processor 904 may fetch, decode, and execute the instructions 912 to maintain the access of the third-party provider 106 to the website 108 using the primary interface 104.

The processor 904 may fetch, decode, and execute the instructions 914 to control, using the accessed primary interface 104 or the accessed fallback interface 114, operations between the third-party provider 106 and the website 108 by determining, for a specified time duration, a number of times the third-party provider 106 has accessed the website 108, and based on a determination that the number of times the third-party provider 106 has accessed the website 108 exceeds a third-party provider 106 access threshold, restricting, during the specified time duration, further access to the website 108 by third-party provider 106.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A system comprising:
   a fallback sensor, executed by at least one hardware processor, to
      ascertain, for a primary interface that is configured to provide a third-party provider access to a website, at least one metric associated with operation of the primary interface, wherein the at least one metric includes a percentage of incorrect responses within a specified time duration,
      compare the at least one metric to at least one corresponding metric threshold;
      based on a determination that the at least one metric exceeds the at least one corresponding metric threshold,
         generate an indication of a failure associated with the primary interface, and
         switch the access of the third-party provider to the website from the primary interface to a fallback interface, and
      based on a determination that the at least one metric is less than or equal to the at least one corresponding metric threshold, maintain the access of the third-party provider to the website using the primary interface; and
   a third-party provider communication implementer, executed by the at least one hardware processor, to
      implement the primary interface and the fallback interface by
         implementing the fallback interface as a controlled Hypertext Transfer Protocol (HTTP) access to a subset of web pages and functionalities of the website, and
         implementing the primary interface as an application programming interface service layer that is exposed to the third-party provider by a specific integration protocol, and
      control, using the accessed primary interface or the accessed fallback interface, operations between the third-party provider and the website.

2. The system according to claim 1, wherein the fallback sensor and the third-party provider communication implementer are to be plugged into the website to operate with the website.

3. The system according to claim 1, wherein the third-party provider communication implementer is executed by the at least one hardware processor to control, using the accessed primary interface or the accessed fallback interface, operations between the third-party provider and the website by:
   determining whether a communication session associated with the website includes a server-based transport layer security authentication or a mutual transport layer security authentication; and
   in response to a determination that the communication session associated with the website includes the server-based transport layer security authentication,
      identifying, using a transport layer security reverse proxy, the communication session as a direct channel session, and
      proxying, to the website, the direct channel session as a server-based transport layer security authentication session.

4. The system according to claim 1, wherein the third-party provider communication implementer is executed by the at least one hardware processor to control, using the accessed primary interface or the accessed fallback interface, operations between the third-party provider and the website by:
   determining whether a communication session associated with the website includes a server-based transport layer security authentication or a mutual transport layer security authentication; and
   in response to a determination that the communication session associated with the website includes the mutual transport layer security authentication,
      identifying, using a transport layer security reverse proxy, the communication session as a third-party provider session,
      authenticating, by using a certificate, the third-party provider associated with the third-party provider session, and
      based on the authentication of the third-party provider, terminating the third-party provider session, and
      initiating, with the website, a new session as a server-only authentication session.

5. The system according to claim 1, wherein the third-party provider communication implementer is executed by the at least one hardware processor to control, using the accessed primary interface or the accessed fallback interface, operations between the third-party provider and the website by:
   determining whether a communication session associated with the website includes a server-based transport layer security authentication or a mutual transport layer security authentication; and
   in response to a determination that the communication session associated with the website includes the mutual transport layer security authentication,
      identifying, using a transport layer security reverse proxy, the communication session as a third-party provider session,
      authenticating, by using a certificate, the third-party provider associated with the third-party provider session,
      determining whether the third-party provider is included in a third-party provider blacklist, and
      based on the authentication of the third-party provider, and further in response to a determination that the third-party provider is not included in the third-party provider blacklist,
         terminating the third-party provider session, and
         initiating, with the website, a new session as a server-only authentication session.

6. The system according to claim 1, wherein the third-party provider communication implementer is executed by the at least one hardware processor to control, using the accessed primary interface or the accessed fallback interface, operations between the third-party provider and the website by:
   determining, for a specified time duration, a number of times the third-party provider has accessed the website; and
   based on a determination that the number of times the third-party provider has accessed the website exceeds a third-party provider access threshold, restricting, during the specified time duration, further access to the website by third-party provider.

7. The system according to claim 1, wherein the website includes an Internet banking website.

8. The system according to claim 1, wherein the primary interface includes an access-to-account application programming interface of the Internet banking website.

9. A computer implemented method comprising:
   ascertaining, by at least one processor, for a primary interface that is configured to provide a third-party provider access to a website, at least one metric associated with operation of the primary interface, wherein the at least one metric includes a percentage of incorrect responses within a specified time duration;
   comparing, by the at least one processor, the at least one metric to at least one corresponding metric specification;
   based on a determination, by the at least one processor, that the at least one metric does not meet the at least one corresponding metric specification,
      generating, by the at least one processor, an indication of a failure associated with the primary interface, and
      switching, by the at least one processor, the access of the third-party provider to the website from the primary interface to a fallback interface;
   based on a determination, by the at least one processor, that the at least one metric meets the at least one corresponding metric specification, maintaining, by the at least one processor, the access of the third-party provider to the website using the primary interface;
   implementing the primary interface and the fallback interface by
      implementing the fallback interface as a controlled Hypertext Transfer Protocol (HTTP) access to a subset of web pages and functionalities of the website, and
      implementing the primary interface as an application programming interface service layer that is exposed to the third-party provider by a specific integration protocol; and
   controlling, by the at least one processor and using the accessed primary interface or the accessed fallback interface, operations between the third-party provider and the website
      in response to a determination of whether a communication session associated with the website includes a server-based transport layer security authentication, or a mutual transport layer security authentication.

10. The method according to claim 9, wherein the website includes an Internet banking website.

11. The method according to claim 9, wherein controlling, by the at least one processor and using the accessed primary interface or the accessed fallback interface, operations between the third-party provider and the website in response to the determination of whether the communication session associated with the website includes the server-based transport layer security authentication, or the mutual transport layer security authentication further comprises:
   in response to a determination that the communication session associated with the website includes the server-based transport layer security authentication,
      identifying, using a transport layer security reverse proxy, the communication session as a direct channel session, and
      proxying, to the website, the direct channel session as a server-based transport layer security authentication session.

12. The method according to claim 9, wherein controlling, by the at least one processor and using the accessed primary interface or the accessed fallback interface, operations between the third-party provider and the website in response to the determination of whether the communication session associated with the website includes the server-based transport layer security authentication, or the mutual transport layer security authentication further comprises:
   in response to a determination that the communication session associated with the website includes the mutual transport layer security authentication,
      identifying, using a transport layer security reverse proxy, the communication session as a third-party provider session,
      authenticating, by using a certificate, the third-party provider associated with the third-party provider session, and
      based on the authentication of the third-party provider, terminating the third-party provider session, and
         initiating, with the website, a new session as a server-only authentication session.

13. The method according to claim 9, wherein controlling, by the at least one processor and using the accessed primary interface or the accessed fallback interface, operations between the third-party provider and the website in response to the determination of whether the communication session associated with the website includes the server-based transport layer security authentication, or the mutual transport layer security authentication further comprises:
   in response to a determination that the communication session associated with the website includes the mutual transport layer security authentication,
      identifying, using a transport layer security reverse proxy, the communication session as a third-party provider session,
      authenticating, by using a certificate, the third-party provider associated with the third-party provider session,
      determining whether the third-party provider is included in a third-party provider blacklist, and
      based on the authentication of the third-party provider, and further in response to a determination that the third-party provider is not included in the third-party provider blacklist,
         terminating the third-party provider session, and
         initiating, with the website, a new session as a server-only authentication session.

14. A non-transitory computer readable medium having stored thereon machine readable instructions, the machine readable instructions, when executed, cause at least one hardware processor to:
   ascertain, for a primary interface that is configured to provide a third-party provider access to a website, at least one metric associated with operation of the primary interface, wherein the at least one metric includes a percentage of incorrect responses within a specified time duration;
   compare the at least one metric to at least one corresponding metric specification;
   based on a determination that the at least one metric does not meet the at least one corresponding metric specification,
      generate an indication of a failure associated with the primary interface, and
      switch the access of the third-party provider to the website from the primary interface to a fallback interface;
   based on a determination that the at least one metric meets the at least one corresponding metric specification, maintain the access of the third-party provider to the website using the primary interface;
   implement the primary interface and the fallback interface by
      implementing the fallback interface as a controlled Hypertext Transfer Protocol (HTTP) access to a subset of web pages and functionalities of the website, and
      implementing the primary interface as an application programming interface service layer that is exposed to the third-party provider by a specific integration protocol; and
   control, using the accessed primary interface or the accessed fallback interface, operations between the third-party provider and the website by
      determining, for a specified time duration, a number of times the third-party provider has accessed the website, and
      based on a determination that the number of times the third-party provider has accessed the website exceeds a third-party provider access threshold, restricting, during the specified time duration, further access to the website by third-party provider.

15. The non-transitory computer readable medium according to claim 14, wherein the website includes an Internet banking website.

16. The non-transitory computer readable medium according to claim 14, wherein the machine readable instructions to control, using the accessed primary interface or the accessed fallback interface, operations between the third-party provider and the website, when executed by the at least one hardware processor, further cause the at least one hardware processor to:
   determine whether a communication session associated with the website includes a server-based transport layer security authentication or a mutual transport layer security authentication; and
   in response to a determination that the communication session associated with the website includes the server-based transport layer security authentication,
      identify, using a transport layer security reverse proxy, the communication session as a direct channel session, and proxy, to the website, the direct channel session as a server-based transport layer security authentication session.

17. The non-transitory computer readable medium according to claim 14, wherein the machine readable instructions to control, using the accessed primary interface or the accessed fallback interface, operations between the third-party provider and the website, when executed by the at least one hardware processor, further cause the at least one hardware processor to:
- determine whether a communication session associated with the website includes a server-based transport layer security authentication or a mutual transport layer security authentication; and
- in response to a determination that the communication session associated with the website includes the mutual transport layer security authentication,
  - identify, using a transport layer security reverse proxy, the communication session as a third-party provider session,
  - authenticate, by using a certificate, the third-party provider associated with the third-party provider session, and
  - based on the authentication of the third-party provider, terminate the third-party provider session, and initiate, with the website, a new session as a server-only authentication session.

18. The non-transitory computer readable medium according to claim 14, wherein the machine readable instructions to control, using the accessed primary interface or the accessed fallback interface, operations between the third-party provider and the website, when executed by the at least one hardware processor, further cause the at least one hardware processor to:
- determine whether a communication session associated with the website includes a server-based transport layer security authentication or a mutual transport layer security authentication; and
- in response to a determination that the communication session associated with the website includes the mutual transport layer security authentication,
  - identify, using a transport layer security reverse proxy, the communication session as a third-party provider session,
  - authenticate, by using a certificate, the third-party provider associated with the third-party provider session,
  - determine whether the third-party provider is included in a third-party provider blacklist, and
  - based on the authentication of the third-party provider, and further in response to a determination that the third-party provider is not included in the third-party provider blacklist,
    - terminate the third-party provider session, and
    - initiate, with the website, a new session as a server-only authentication session.

19. The non-transitory computer readable medium according to claim 14, wherein the machine readable instructions to control, using the accessed primary interface or the accessed fallback interface, operations between the third-party provider and the website, when executed by the at least one hardware processor, further cause the at least one hardware processor to:
- determine, for a specified time duration, a number of times the third-party provider has accessed the website; and
- based on a determination that the number of times the third-party provider has accessed the website exceeds a third-party provider access threshold, restrict, during the specified time duration, further access to the website by third-party provider.

* * * * *

UNITED STATES PATENT AND TRADEMARK OFFICE
CERTIFICATE OF CORRECTION

PATENT NO. : 10,530,635 B2  
APPLICATION NO. : 16/235839  
DATED : January 7, 2020  
INVENTOR(S) : Andreoli et al.

Page 1 of 1

It is certified that error appears in the above-identified patent and that said Letters Patent is hereby corrected as shown below:

On the Title Page

Item (30), Foreign Application Priority Data:  
"18174024"  
Should read:  
"18174024.2"

Signed and Sealed this  
Twenty-fifth Day of February, 2020

Andrei Iancu  
*Director of the United States Patent and Trademark Office*